United States Patent [19]
Storey et al.

[11] Patent Number: 5,756,652
[45] Date of Patent: May 26, 1998

[54] POLY (ESTER-ANHYDRIDES) AND INTERMEDIATES THEREFOR

[75] Inventors: Robson F. Storey, Hattiesburg, Miss.; Z. David Deng; Dale R. Peterson, both of Carmel, Ind.; Todd P. Glancy, Fairmount, Ind.

[73] Assignee: DePuy Orthopaedics, Inc., Warsaw, Ind.

[21] Appl. No.: 609,099

[22] Filed: Feb. 29, 1996

[51] Int. Cl.$^6$ ............................................. C08G 63/06
[52] U.S. Cl. ........................ 528/361; 528/271; 528/354; 528/361; 528/398; 424/78.01; 424/426
[58] Field of Search ............................ 528/271, 354, 528/361, 398; 424/78.01, 426

[56] References Cited

U.S. PATENT DOCUMENTS

| | | |
|---|---|---|
| 4,757,128 | 7/1988 | Domb et al. |
| 4,888,176 | 12/1989 | Langer et al. |
| 4,906,474 | 3/1990 | Langer et al. |
| 5,019,379 | 5/1991 | Domb et al. |
| 5,171,579 | 12/1992 | Ron et al. |
| 5,206,341 | 4/1993 | Ibay et al. |
| 5,286,763 | 2/1994 | Gerhart et al. |

FOREIGN PATENT DOCUMENTS 3-45265  2/1991  Japan.

OTHER PUBLICATIONS

Hollinger, Jeffrey O. et al., *Biodegradable Bone Repair Materials*, Clinical Orthopaedics and Related Research, No. 207, pp. 290–305, (Jun. 1986).

Kohn, Joachim et al., *Polymerization Reactions Involving the Side Chains of a–L–Amino Acids*, J. Am. Chem. Soc., 109 pp. 817–820, 1987.

Laurencin, C.T. et al., *Bioerodible Polyanhydrides for Antibiotic Drug Delivery: In Vivo Osteomyelitis Treatment in a Rat Model System*, Journal of Orthopaedic Research, No. 11, pp. 256–262, 1993.

Leong, K.W. et al., *Bioerodible Polyanhydrides as Drug–Carrier Matrices. I: Characterization, Degradation, and Release Characteristics*, J. Biomed. Mater. Res., vol. 19, pp. 941–955, 1985.

Storey, Robson F. et al., *New Epoxy–Terminated Oligoesters: Precursors to Totally Biodegradable Networks*, Journal of Polymer Science Part A: Polymer Chemistry, vol. 31, pp. 1825–1838, 1993.

*Primary Examiner*—Samuel A. Acquah
*Attorney, Agent, or Firm*—Barnes & Thornburg

[57] ABSTRACT

Biodegradable poly(ester-anhydrides) designed to display two-stage degradation profiles are described. The presence of the anhydride linkages allows a relatively rapid decrease in molecular weight, the extent of which is governed by the concentration of the anhydride linkages along the chain, followed by possible dissolution and a slower degradation of the remaining oligomers, the rate of which is governed by the composition of the polyester prepolymers. Methods for the preparation of the poly(ester-anhydrides) and their polyester precursors are also described.

20 Claims, 12 Drawing Sheets

POLY (ESTER-ANHYDRIDES) AND INTERMEDIATES THEREFOR

FIELD OF INVENTION

This invention relates to bioerodable polymers for use in medical application, for example, implants for controlled release of bioactive substances. More particularly, this invention is directed to poly(ester-anhydride) compounds, and methods for their preparation, including an improved method for preparing polyester intermediates.

BACKGROUND AND SUMMARY OF THE INVENTION

Many polymers have been used in biomedical applications, including polyesters, polyvinyl acetate, polyacrylates, polyorthoesters, and polyanhydrides. One of the advantages of polyanhydrides and polyesters in such applications is that they may be both biodegradable and biocompatible.

Aliphatic polyesters have been widely used in the area of biomaterials for implantable drug delivery devices, sutures, and general tissue supports, after injury or surgery. The ester linkages in these aliphatic polyesters are hydrolytically and/or enzymatically labile and render the polymers degradable in aqueous media. The polyesters traditionally of greatest interest in the area of biomaterials are derived from lactide, glycolide, and ε-caprolactone monomers, with a fairly broad range of degradation profiles accessible through various termonomer combinations. However, in many cases it is desirable to produce unique degradation profiles outside of this range by incorporating functional units along the polymer backbone that are more readily or less readily degradable than ester functional units. Typically, more rapid initial degradation, or specific degradation profiles such as surface erosion are desired, and in these cases anhydride linkages have been used instead of ester linkages, along with hydrophobic modifications of the polymer chain to prevent bulk degradation.

Syntheses of various polyanhydrides for use in biomedical applications have been reported in the literature. Aromatic polyanhydrides have been prepared by first converting dibasic acids into mixed anhydrides by reaction with acetic anhydride, followed by melt polycondensation with elimination of acetic anhydride. Langer and coworkers produced polyanhydrides at ambient temperature using a one-step polymerization with phosgene or diphosgene as coupling agents. Poly(anhydride-coimides) have been synthesized and characterized extensively. Unsaturated poly(anhydrides) have been prepared to be used to form crosslinked networks. Virtually all prior investigations of polyanhydrides have involved high molecular weight homopolymers and copolymers produced using condensation polymerization of monomeric dicarboxylic acids.

In accordance with the present invention polyesters containing one or more anhydride functions along the polymer backbone are synthesized by the condensation polymerization of linear, aliphatic polyester prepolymers carrying terminal carboxylic acid groups. Such anhydrides degrade into naturally occurring metabolites, in contrast to prior art polyanhydrides. An improved catalyst free method of preparing such polyester prepolymers and related polyester compounds has been developed using a hydric initiator, preferably in the presence of a cyclic anhydride terminator to provide high yields of well-defined polyester prepolymers in a catalyst-free, high purity form. In the present poly(ester-anhydride) systems, the placement of the anhydride function along the polymer backbone is controlled by the molecular weight of the polyester prepolymer. Very mild reaction conditions are used for the formation of the anhydride linkages so as not to destroy the polyester backbone.

In one aspect of the present invention, the molecular weight and functionality of the prepolymer is selected to have a threshold water solubility at 25° C. between about 0.01 to about 400 mg/mL of water so that cleavage of the labile anhydride linkage(s) yields polyester fragments that are below the molecular weight threshold for solubility.

It is another object of this invention to provide biodegradable poly(ester-anhydrides) designed to display two-stage degradation profiles.

It is another object of this invention to provide a method for preparing poly(ester-anhydride) compounds utilizing carboxy terminated polyester prepolymers. It is still another object of this invention to provide an improved method for synthesis of polyester polymers, including carboxy-terminated prepolymers for use in poly(ester-anhydride) synthesis of well-defined composition and in a catalyst free, highly pure form.

DETAILED DESCRIPTION OF THE INVENTION

Figure 1A:
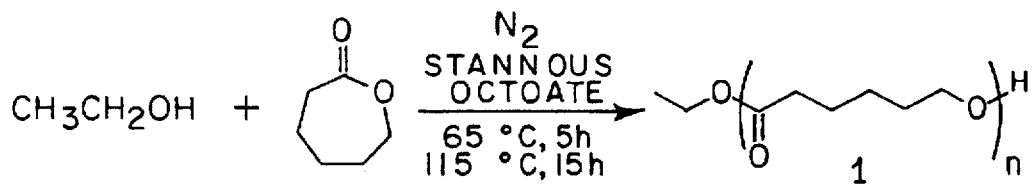
FIG. 1 depicts reaction schemes for (a) ethanol initiated polymerization of ε-caprolactone, (b) succinic acid termination of ethanol-initiated poly(ε-caprolactone), and (c) reaction of succinic acid-terminated poly(ε-caprolactone) with diphenylchlorophosphate.
Figure 1B:
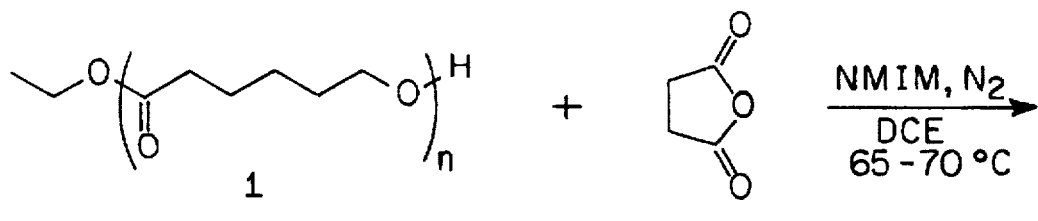
Figure 1C:
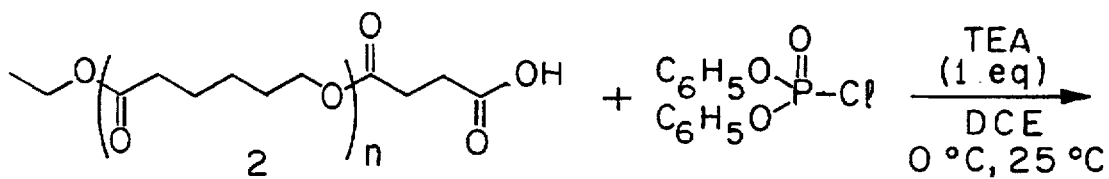
Figure 1C:
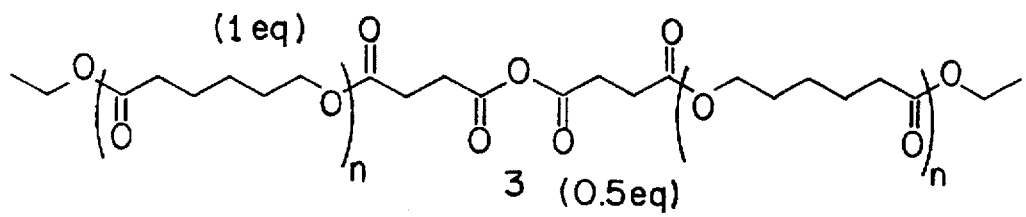

There is provided in accordance with this invention poly(ester-anhydride) compounds comprising 2 to 20 polyester segments covalently bound through anhydride linkages, each segment having a number average molecular weight of about 400 to about 5,000 g/mol, more preferably about 700 to about 2500 g/mol. The polyester segment components can comprise a homopolymer, copolymer or terpolymer of biocompatible hydroxy acids, for example, lactic acid, glycolic acid, ε-hydroxycaproic acid and γ-hydroxy valeric acid. Alternatively, the polyester segments can be formed by copolymerization of a polyhydric alcohol and a biocompatible polycarboxylic acid. Most typically such copolymers are formed between dihydric alcohols, for example, propylene glycol for biocompatibility and biocompatible dicarboxylic acids. Representative carboxylic acids for formation of prepolymer polyesters useful for preparing the poly(ester-anhydrides) in accordance with this invention include Kreb's cycle intermediates such as citric, isocitric, cis-aconitic, α-ketoglutaric, succinic, maleic, oxaloacetic and fumaric acids. Many of such carboxylic acids have additional functionalities which can enable further crosslinking of the polymers if desirable.

In one embodiment of the present invention the polyester prepolymer compound segments utilized for forming the present poly(ester-anhydride) compounds are selected to have a threshold water solubility between about 0.01 and about 400 mg/mL of water, thereby facilitating in vivo dissolution of the polyester component following hydrolytic cleavage of the linking anhydride bonds. Subsequent hydrolysis of the solubilized polyester components in serum at a site removed from the point of implantation, for example, helps to prevent the occurrence of significant localized pH gradients which can be detrimental to surrounding tissue viability.

The poly(ester-anhydride) compounds of this invention are prepared by reacting a carboxy-terminated polyester prepolymer represented by the general formula PE–COOH, alone with diphenylchlorophosphate to form a poly(ester-anhydride) with one anhydride linkage, or in combination with a bis-carboxy-terminated polyester polymer compound represented herein by the general formula HOOC–PE'–COOH, to form a product with multiple anhydride linkages. Other art recognized processes for anhydride bond formation can be utilized, however, the use of diphenylchlorophosphate is particularly preferred due to the mild reaction conditions and the stability of the polyester components under such conditions. The reaction is typically carried out in a dry aprotic solvent, for example, ethers or halogenated hydrocarbons, in the presence of an acid scavenger, preferably a tertiary amine base, at about 0° to room temperature. The reaction provides the present poly (ester-anhydrides) in high yields.

In the above formula PE and PE' represent polyester moieties that can be of the same or different types (as mentioned above) or of the same or different molecular weights. The carboxy terminus (or termini) on such compounds can be formed by reaction of hydroxy functional polyesters with, for example, a stoichiometric amount of a cyclic anhydride of a $C_1$–$C_6$ carboxylic acid. Bis-hydroxy functional polyesters are readily prepared by reaction of a dihydric alcohol, for example, propylene glycol or ethylene glycol, with one or more cyclic hydroxy acid esters, for example lactide, glycolide or caprolactone. Reaction of such bis-hydroxy functional polyesters with cyclic anhydrides produce bis-carboxy functional polyesters useful for preparation of the present poly(ester-anhydrides) as described above.

The polyester prepolymers used for the preparation of the present poly(ester-anhydride)compounds can be prepared using art recognized polyester forming reaction chemistry, typically employing, for example, metal catalysts to promote ester-forming reactions. One problem with such prior art procedures is the difficulty in removing the metal catalyst from the product polyesters. Such is particularly crucial when the polyesters are intended for use in medical applications. It has been found that polyesters of hydroxy acids can be prepared in high yields and high purity with good control over structure/functionality by reacting the corresponding cyclic esters with a hydroxy functional initiator at elevated temperatures under substantially anhydrous conditions. Thus there is provided in accordance with this invention a method for preparing a polyester compound of the formula $R^2OCO$—PE—OH wherein PE is the divalent residue of a polyester comprising a hydroxy acid polymer, and $R^2$ is the residue of a hydroxy functional initiator of the formula $R^2OH$. The method consists essentially of reacting the initiator with at least one cyclic hydroxy acid ester under substantially anhydrous conditions at elevated temperatures. The reaction is preferably carried out neat (an absence of solvent) at a temperature of about 100°–180° C., more preferably about 120°–160° C. The term "substantially anhydrous conditions" as utilized in defining the conditions for polyester formation requires simply that routine efforts be made to exclude water from the reaction mixture and can typically include such steps as pre-drying the reaction vessel with heat and carrying out the reaction under drying conditions.

The structure of the polyester is controlled by selection and stoichiometry of the cyclic hydroxy acid ester reactant (s) and the amount of initiator utilized with lower relative initiator amounts leading to higher average molecular weight product and higher relative amounts of initiator leading to lower average molecular weight product.

The hydroxy functional initiator can either be a monohydric alcohol, for example a $C_1$–$C_4$ alkanol, or a di-or polyhydric alcohol. Alternatively, the hydroxy functional initiator can be a hydroxy acid, for example glycolic acid ($R^2$=$CH_2COOH$). The product hydroxy-terminated polyesters can be readily converted to a carboxy-terminated polyester for use in preparation of the present poly(ester-anhydrides) by reaction with a stoichiometric amount of a cyclic anhydride.

The present improved method for preparing polyester polymers for use in preparing the present poly(ester-anhydrides)of this invention can be carried out as well in the presence of a cyclic carboxylic acid anhydride to provide directly a carboxy terminated polyester compound of the formula $R^2OCO$—PE—$OCOR^3COOH$ wherein $R^3$ is the divalent residue of a cyclic carboxylic anhydride of the formula $OCOR^3CO$. The reaction is carried out under the same conditions as described above for preparing the polyester prepolymers of the formula $R^2OCO$—PE—OH. Most typically the reaction is carried out using near equimolar amounts of the initiator and the cyclic anhydride. Where the initiator is a dihydric alcohol, the molar ratio of the cyclic anhydride to the initiator is preferably raised to about 2:1.

The poly(ester-anhydrides)of the present invention are used in the preparation of bioresorbable implants. Thus they can be used alone or in combination with biologically active ingredients to provide a source of prolonged release of such bioactive agent following implantation. The use and construction of such devices are well known in the art, and the present poly(ester-anhydrides) can be substituted for prior art polymer compositions in preparation of such devices.

EXAMPLE 1

Materials.

The following reagents were used without further purification: chloroform-d (99.8 atom %, 1% TMS) (Aldrich), ε-caprolactone (Union Carbide), 1,2-dichloroethane (DCE) (Aldrich), diethylene glycol, 99% (DEG) (Aldrich), diphenylchlorophosphate, 99% (DPCP) (Aldrich), ethanol (EtOH), 100% (AAPER Alcohol and Chemical Co.), hexanes (Fisher), hydrochloric acid HCl (Fisher), magnesium sulfate (Fisher), methylene chloride (Fisher), 1-methylimidazole 99+% (NMIM) (Aldrich), sodium sulfate (Fisher), stannous 2-ethylhexanoate (stannous octate) (Sigma), succinic anhydride 97% (Aldrich), tetrahydrofuran (THF) (Fisher), and triethylamine, 99% (TEA) (Aldrich).

Hydroxyl-Terminated Polyesters.

Polymerizations of ε-caprolactone (20–40 g) were carried out in the bulk under nitrogen using stannous octoate as catalyst at a concentration of $1.4 \times 10^{-4}$ mole per mole of monomer. Glassware was dried at 145°–155° C. for 24 h, fitted with rubber septa and cooled under a flow of dry nitrogen. Table I lists the initiator, monomer/initiator ratio, and reaction time and temperature for each polymerization. In Table I and throughout the description of this example, specific polymer samples are designated by two numbers separated by a hyphen; the first number indicates the generic type of polymer, and the second number is the sequential sample number. When reference is made to a generic type of polymer, only the first number is used. Type 1 polymers are monohydric poly(ε-caprolactone)s initiated with ethanol; type 4 polymers are dihydric poly(ε-caprolactone)s initiated with diethylene glycol.

TABLE I

Initiator, monomer/initiator ratio, and reaction time and temperature for ε-caprolactone polymerizations

| Sample # | Initiator [I] | [M/ [I] | Temp | Reaction Time |
|---|---|---|---|---|
| 1-1 | EtOH | 8 | 65° C. | 5 h |
|  |  |  | 115° C. | 15 h |
| 1-2 | EtOH | 10 | 65° C. | 5 h |
|  |  |  | 115° C. | 15 h |
| 4-1 | DEG | 8 | 135° C. | 20 h |

A typical polymerization procedure was as follows: to a 250-mL boiling flask were added ε-caprolactone (32.43 g, $2.84 \times 10^{-1}$ mole), ethanol (3.29 g, $7.14 \times 10^{-2}$ mole), and stannous octoate (0.02 g). The flask was purged with nitrogen, sealed with a ground-glass stopper wrapped with Teflon® tape, and placed in an oil bath for 5 h at 65° C. followed by 15 h at 115° C. The polymerization was quenched by chilling the flask in an ice-water bath, and the polymer was dissolved in methylene chloride 25–35% (w/v), followed by precipitation into a ten-fold excess of stirred hexanes. The hexanes layer was decanted, and the polymer was washed with hexanes (3×100 mL). The isolated polymer was then redissolved, transferred to a specimen jar, dried for 24 h in an 80° C. oven, and then for 24–48 h at 80° C. in vacuo.

Carboxylic Acid-Terminated Polyesters.

The hydroxyl end groups of poly(ε-caprolactone)s were converted to carboxylic acid end groups by reaction with succinic anhydride. Type 2 polymers were derived from ethanol-initiated, type 1 polymers and carry one carboxylic acid end group; type 5 polymers were derived from diethylene glycol-initiated, type 4 polymers and carry two carboxylic acid end groups. A typical procedure was as follows: to a 250-mL boiling flask equipped with a condenser, hot oil bath, magnetic stirrer, and nitrogen purge, were added ethanol-initiated poly(ε-caprolactone) (11.28 g, $2.26 \times 10^{-2}$ eq), succinic anhydride (3.39 g, $3.38 \times 10^{-2}$ mole), 1,2-dichloroethane (250 mL), and 1-methylimidazole (1.27 mL). The reaction mixture was heated for 15 h at 65°–70° C. After cooling, the solution was transferred to a separatory funnel and washed with 10% aqueous HCl (2×200 mL) and water (3×250 mL). The organic layer was dried over magnesium sulfate and filtered, and the solvent was removed under reduced pressure.

Poly(Ester-Anhydrides) (Single Anhydride Function).

Anhydride formation was carried out using a modification of the procedure of Mestres and Palomo. [Synthesis, 1981, 218.] Diphenylchlorophosphate (0.22 mL, $1.07 \times 10^{-3}$ mole), at 25° C., was added to a 250-mL boiling flask containing a solution of EtOH-initiated, carboxylic acid-terminated poly (ε-caprolactone) (2.35 g, $2.15 \times 10^{-3}$ eq) and triethylamine (0.30 mL, $2.15 \times 10^{-3}$ mole) in DCE (15 mL at 0° C). The mixture was allowed to warm to room temperature and was stirred for 5 h. The solution was then washed with cold water (3×100 mL), and the organic layer was separated and dried over sodium sulfate. Solvent was removed under reduced pressure, and the product was stored in a freezer. The reaction was also carried out by the addition of a solution of prepolymer and TEA to a solution of DPCP.

Poly(Ester-Anhydrides) (Variable Number of Anhydride Functions).

A solution of EtOH-initiated, carboxylic acid-terminated poly(ε-caprolactone) (1.75 g, $1.75 \times 10^{-3}$ eq) and TEA (0.24 mL, $1.75 \times 10^{-3}$ mole) in DCE (25 mL) was added slowly to a 250-mL boiling flask containing a solution of DPCP (0.36 mL, $1.75 \times 10^{-3}$ eq) in DCE (15 mL) at 0° C. To a separate 250-mL boiling flask containing a solution of DPCP (0.73 mL, $3.504 \times 10^{-3}$ eq) in DCE (15 mL) at 0° C. was slowly added a solution of DEG-initiated, carboxylic acid-terminated poly(ε-caprolactone) (5.65 g, $8.76 \times 10^{-3}$ eq) and TEA (1.22 mL, $8.76 \times 10^{-3}$ mole) in DCE (25 mL). Both mixtures were stirred at room temperature for 1 h, at which time they were re-chilled to 0° C. and mixed together by pouring the solution of the difunctional polymer into that of the monofunctional polymer. The resulting mixture was allowed to warm to room temperature and stirred for 5 h. The final solution was then washed with cold water (3×150 mL), and the organic layer was separated and dried over sodium sulfate. Solvent was removed under reduced pressure and the product was stored in a freezer.

Measurements.

$^{13}$C NMR spectra of the model polymers were obtained on a Bruker AC-200 spectrometer using 5 mm o.d. tubes. Sample concentrations were approximately 25% (w/v) in chloroform-d containing 1% TMS as an internal reference. FT-IR spectra were obtained on a Perkin-Elmer 1600 Series FT-IR spectrometer. Polymer samples were cast as thin films from 0.5% (w/v) methylene chloride solutions on sodium chloride plates and analyzed.

Gel permeation chromatography was used to determine relative molecular weights, and polydispersities, $M_w/M_n$, of the polymer samples with respect to polystyrene standards (Polysciences Corporation). Sample concentrations were approximately 0.5% (w/v) in distilled THF.

Results and Discussion

A poly(ester-anhydride) containing a single anhydride function within the interior of an otherwise all-polyester backbone has been synthesized. Poly($\epsilon$-caprolactone) was used as a model polyester backbone due to the simplicity of its $^{13}$C NMR spectrum and the availability of extensive analysis of its end groups. FIG. 1(a.) depicts the initial step in the overall synthesis in which ethanol was used to initiate the polymerization of $\epsilon$-caprolactone in the presence of stannous octoate to produce monohydric poly($\epsilon$-caprolactone) (1). The polymerization temperature was kept low initially to eliminate evaporation of ethanol, thus producing poly($\epsilon$-caprolactone) with the correct target molecular weight. The next step shown in FIG. 1(b.) involved the reaction of the single hydroxyl group of 1 with succinic anhydride in the presence of NMIM to form the carboxylic acid-terminated prepolymer (2). It was necessary to convert the end group from hydroxyl to carboxylic acid in preparation for the coupling reaction to form an anhydride. Lastly, FIG. 1(c.) shows the anhydride formation reaction which involved the reaction of 2 (1 eq carboxylic acid) with 0.5 mole of diphenylchlorophosphate (0.5 eq phosphoryl chloride) to produce the corresponding anhydride-containing polymer (3). The DPCP reagent, at room temperature, was added to a solution of 2 and TEA in DCE which was initially at 0° C.; upon mixing the reaction was allowed to warm to ambient temperature for the balance of the reaction. These mild conditions for anhydride formation proved to be suitable for reaction with polyesters.

Figure 2C:
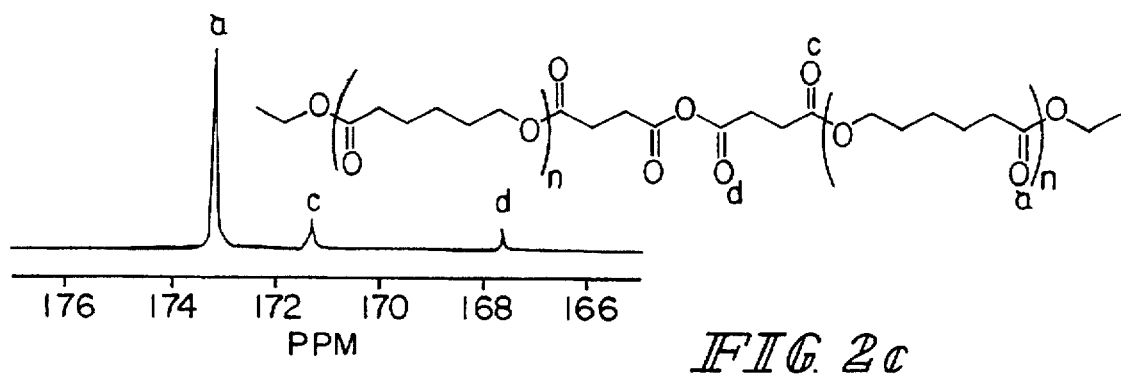
FIG. 2 illustrates $^{13}$C NMR spectra of the carbonyl region for (a) ethanol-initiated, hydroxyl-terminated poly(ε-caprolactone), (b) carboxylic acid-terminated poly(ε-caprolactone), and (c) poly(ε-caprolactone) containing a single anhydride function.
Figure 2B:
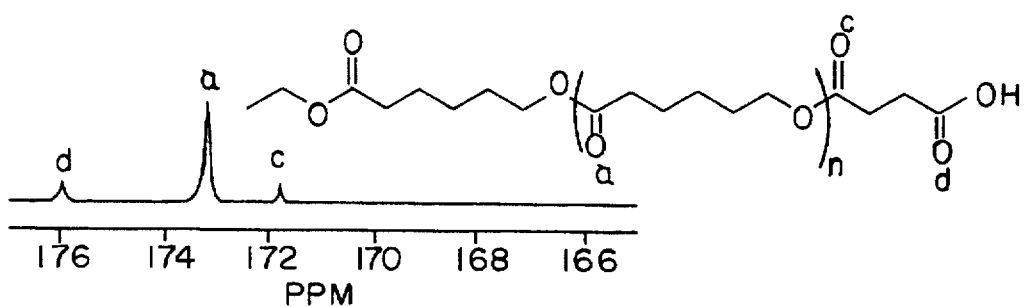
Figure 2A:
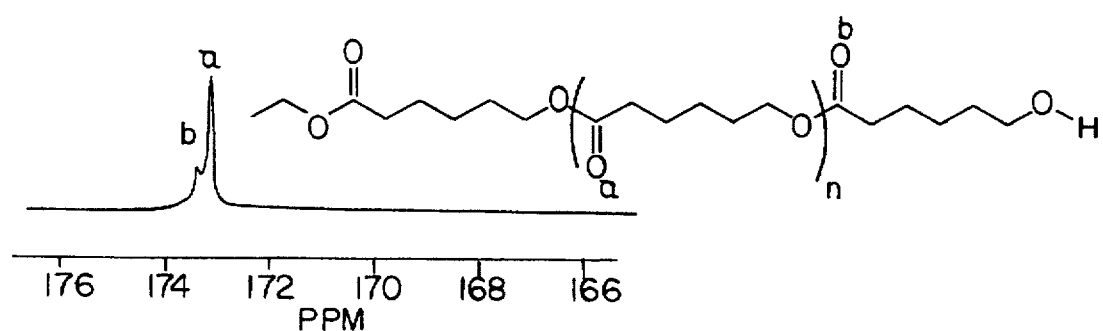
Figure 3C:
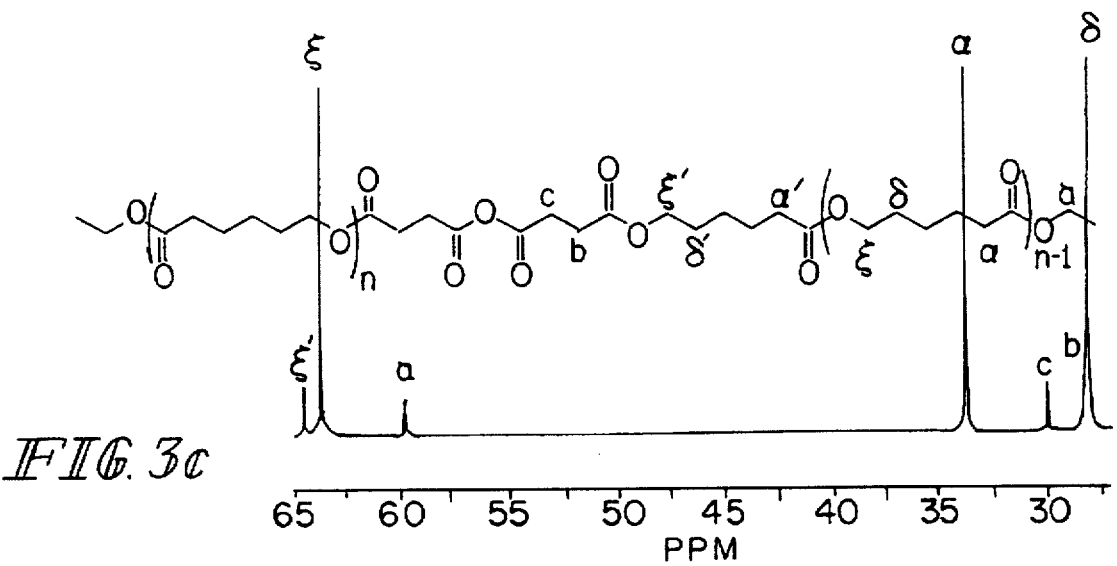
FIG. 3 illustrates $^{13}$C NMR spectra of the ε, α, and δ regions for (a) ethanol-initiated, hydroxyl-terminated poly(ε-caprolactone), (b) carboxylic acid-terminated poly(ε-caprolactone), and (c) poly(ε-caprolactone) containing a single anhydride function.
Figure 3B:
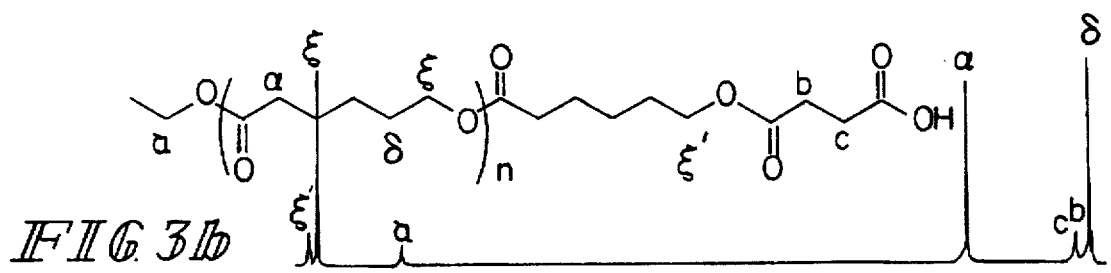
Figure 3A:
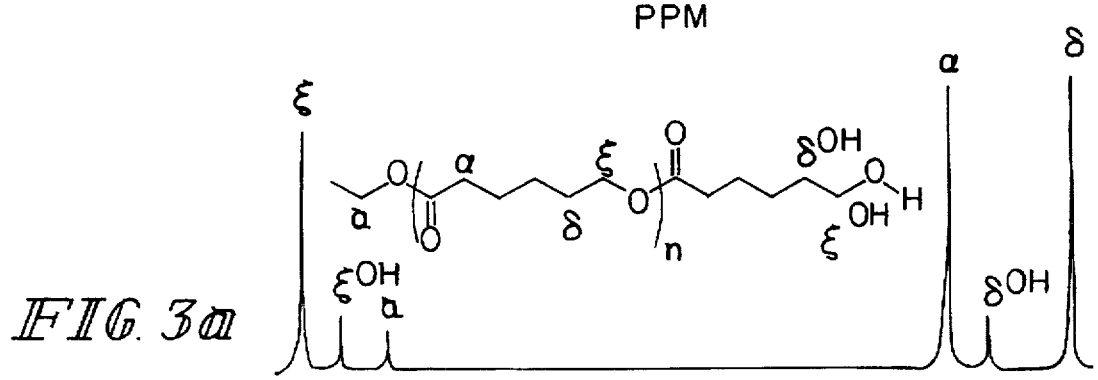

FIGS. 2 and 3 show the changes in the $^{13}$C NMR spectra during anhydride formation for the carbonyl, and $\epsilon$-, $\alpha$-, and $\delta$-carbon regions, respectively, of the poly($\epsilon$-caprolactone) repeat unit. FIG. 2(a.) depicts the carbonyl carbon region of monohydric poly($\epsilon$-caprolactone) (1). The more intense signal at 173.3 ppm (a) was assigned to the main-chain carbonyl carbons, and the companion signal at 173.5 ppm (b) was attributed to the terminal carbonyl carbon nearest to the hydroxyl end group. These assignments are typical for hydroxyl-terminated poly($\epsilon$-caprolactone). Surprisingly, the carbonyl carbon adjacent to the terminal ethanol group was indistinguishable from the main-chain carbonyl carbons. FIG. 2(b.) depicts the carbonyl region of the carboxylic acid-terminated prepolymer (2), which resulted from end-capping of the hydroxyl-terminated prepolymer with succinic anhydride. The signal for the main-chain carbonyl carbons (a) remained at 173.3 ppm; however, it was no longer accompanied by a separate resonance due to the carbonyl carbon nearest to the hydroxyl end of the chain. Instead, two new signals appeared which are characteristic of the carbonyl carbons of the succinic acid moiety. The upfield signal at 171.9 ppm (c) was attributed to the carbonyl carbon adjacent to the terminal $\epsilon$-caprolactone repeat unit, and the downfield signal at 176.0 ppm (d) was assigned to the carbonyl carbon of the carboxylic acid end group. Lastly, FIG. 2(c.) depicts the carbonyl region of poly($\epsilon$-caprolactone) containing a single anhydride unit (3). Again, the signal for the main-chain carbonyl carbons remained virtually unchanged at 173.2 ppm (a). However, the signal for the carbonyl carbon adjacent to the terminal $\epsilon$-caprolactone moiety shifted 0.5 ppm to 171.4 ppm (c), and this shift is consistent with the loss of hydrogen bonding with the terminal carboxylic acid proton. The most significant shift was displayed by the carbonyl carbon of the acid end group, from 176.0 ppm to 167.7 ppm (d) upon formation of the anhydride functional group. This large upfield shift is characteristic for the conversion of acid carbonyl to anhydride carbonyl groups, and is partially due to the elimination of any hydrogen bonding effects.

FIG. 3 shows $^{13}$C NMR spectra of the $\epsilon$-, $\alpha$-, and $\delta$-carbon regions of poly($\epsilon$-caprolactone)-based prepolymers 1, 2, and 3. The characteristic $\epsilon$-, $\alpha$-, and $\delta$-carbon main-chain resonances of poly($\epsilon$-caprolactone) are located at 63.9, 33.8, and 28.1 ppm, respectively, and do not change significantly from one prepolymer to the next. The signal at 60.0 ppm (a) for all prepolymers was ascribed to the methylene carbon of the ethanol initiator. The carbon resonances of greatest importance are the end group resonances for the $\epsilon$- and $\delta$-carbons because they offer the most information about reaction at the polymer chain end. FIG. 3(a.) depicts the $^{13}$C NMR spectrum of prepolymer 1. Characteristic hydroxyl end group resonances ($\epsilon^{OH}$) and ($\delta^{OH}$) are visible at 62.0 ppm and 32.0 ppm, respectively, as described previously. In the spectrum of the carboxylic acid-terminated prepolymer (2), FIG. 3(b.), the $\epsilon^{OH}$-carbon peak has disappeared, and a new resonance ($\epsilon'$) has appeared at 64.3 ppm. The $\epsilon'$ resonance is due to the carbon, formerly adjacent to the hydroxyl group, which is adjacent to the newly formed ester function. This 2.3 ppm downfield shift is consistent with esterification of the terminal hydroxyl group. The spectrum also shows two new carbon resonances at 28.6 ppm (b) and 28.7 ppm (c), which were ascribed to the succinyl methylene carbons of the terminal succinic acid moiety. The downfield resonance (c) was logically assigned to the methylene carbon adjacent to the carboxylic acid group. The $\delta^{OH}$-carbon signal disappeared upon succinic acid termination, presumably becoming indistinguishable from that of the main-chain $\delta$-carbons. Thus, addition of the succinic acid moiety to the chain end replaces the hydroxyl group with an ester group and causes the adjacent $\epsilon$-, and especially $\delta$-carbons to become more chemically similar to their main-chain counterparts. Finally, FIG. 3(c.) depicts the $^{13}$C NMR spectrum of the anhydride-containing polymer (3). The succinyl methylene carbon farther from the anhydride linkage was observed at 28.2 ppm (b) reflecting a 0.4 ppm upfield shift, and the one closer to the anhydride linkage at 30.0 ppm (c), representing a downfield shift of 0.3 ppm. The $\epsilon'$ signal at 64.5 ppm was shifted slightly downfield from its previous position of 64.3 ppm, which was attributed to the loss of cyclic hydrogen bonding upon anhydride formation.

Figure 4:
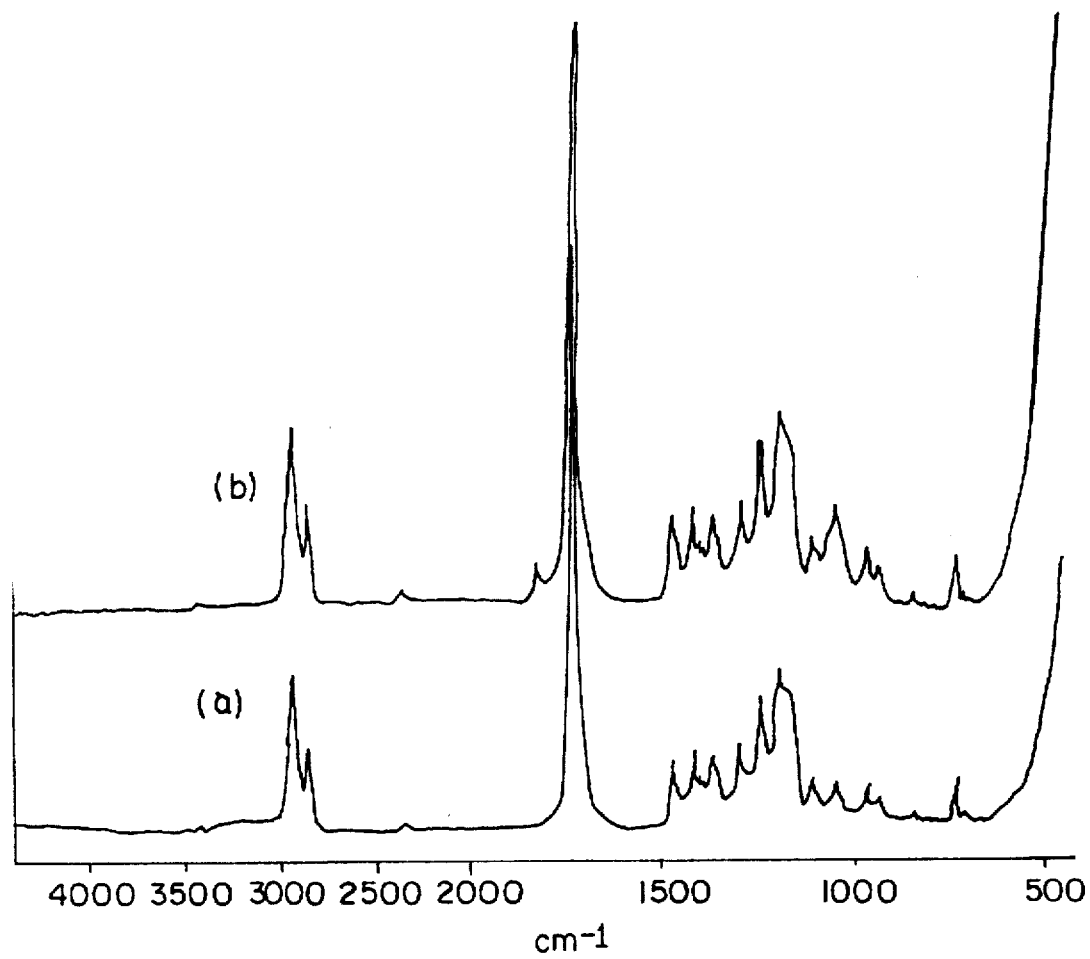
FIG. 4 presents FT-IR spectra for (a) carboxylic acid-terminated poly(ε-caprolactone), and (b) poly(ε-caprolactone) containing a single anhydride function.

FT-IR spectroscopy was also very useful in confirming the presence of an anhydride function in the interior of the poly($\epsilon$-caprolactone) backbone. FIGS. 4(a.) and (b.) depict prepolymers 2 and 3, respectively. The most significant evidence for anhydride formation is the appearance in spectrum (b.) of a new carbonyl stretch at 1800 cm$^{-1}$, indicative of an anhydride carbonyl group.

Gel permeation chromatography (GPC) provided further compelling evidence for anhydride formation. GPC was used to monitor the relative number average molecular weights ($M_n$) and molecular weight distributions (MWD) of the poly(ε-caprolactone) prepolymers. Table II lists the GPC data for all carboxylic acid terminated prepolymers and their anhydride containing analogues.

TABLE II

Molecular weights and molecular weight distribution for carboxylic acid-terminated polymers and their anhydride containing analogues

| Sample # | Mn | MWD |
| --- | --- | --- |
| 2-1 | 1,200 | 1.22 |
| 2-2 | 1,500 | 1.28 |
| 5-1 | 1,600 | 1.33 |
| 3-1 | 2,000 | 1.25 |
| 3-2 | 3,000 | 1.27 |
| 6-1 | 4,700 | 2.33 |
| 3-1-D* | 1,100 | 1.37 |
| 3-2-D | 1,400 | 1.41 |
| 6-1-D | 1,600 | 1.40 |

D*= degraded for 72 h at 37° C. in buffered saline solution

Figure 5:
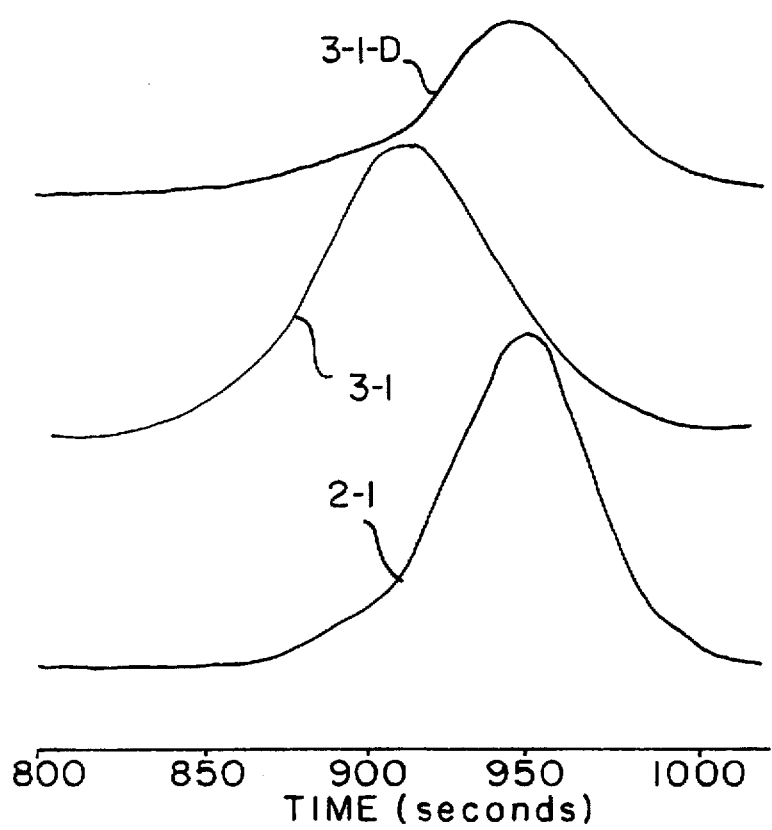
FIG. 5 shows gel permeation chromatographs for (a) carboxylic acid-terminated poly(ε-caprolactone) (2-1), (b) poly(ε-caprolactone) containing a single anhydride function (3-1), and (c) poly(ester-anhydride) after degradation in 37° C. buffered saline solution for 72 h (3-1-D).

FIG. 5 depicts the chromatograms of a monofunctional carboxylic acid-terminated poly(ε-caprolactone) (2-1), its anhydride-coupled product (3-1), and the latter polymer after being hydrolyzed for 72 h in buffered saline solution at 37° C. (3-1-D). The $M_n$ for 2-1 relative to poly(styrene) standards was 1,200 g/mol, with MWD=1.22. Upon coupling of 2-1 via anhydride formation to form 3-1, GPC analysis yielded $M_n$=2,000 g/mol and MWD=1.25. The fact that the $M_n$ nearly doubled offers strong evidence for the success of the anhydride-forming reaction. Upon degradation of 3-1 in buffered saline for 72 h at 37° C., GPC analysis indicated $M_n$=1,100 g/mol and MWD=1.37, showing that the polymer had completely degraded back to its original carboxylic acid-terminated analogue, with only a slight broadening of the MWD. As expected the poly(ε-caprolactone) backbone remained intact due to its stability in buffer solution over short periods of time. The anhydride reaction was repeated using a different monofunctional carboxylic acid-terminated prepolymer (2-2) and a change in the order of addition of reactants in the reaction procedure. In this case, a solution of 2-2($M_n$=1,500 g/mol and MWD=1.28) and TEA was added to a solution of DPCP, instead of the reverse. This change in protocol yielded an anhydride-coupled product (3-2) with a number average molecular weight exactly equal to theoretical ($M_n$=3,000 g/mol and MWD=1.27). After 3.2 was subjected to a 37° C. buffered saline solution for 72 h (3-2-D) the resulting $M_n$ was 1,400 g/mole (MVD=1.41).

Figure 6:
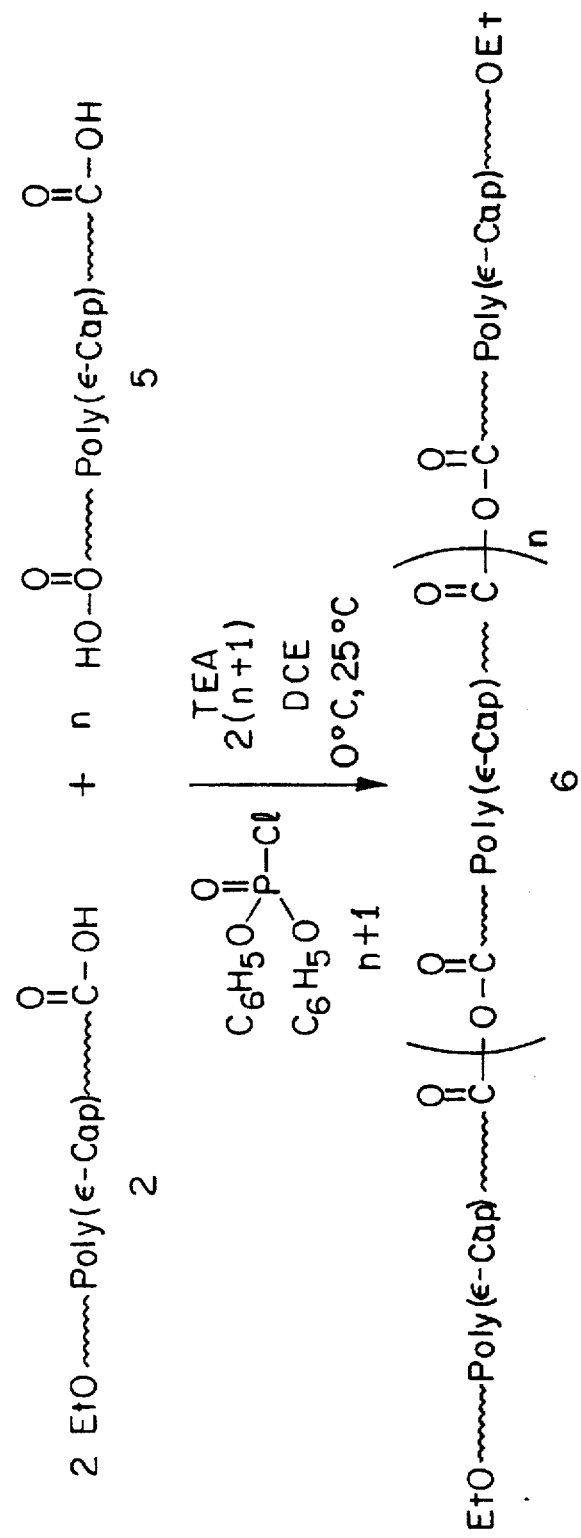
FIG. 6 illustrates reaction of monofunctional carboxylic acid-terminated poly(ε-caprolactone) (2) and difunctional carboxylic acid-terminated poly(ε-caprolactone) (5) and diphenylchlorophosphate.
Figure 7C:
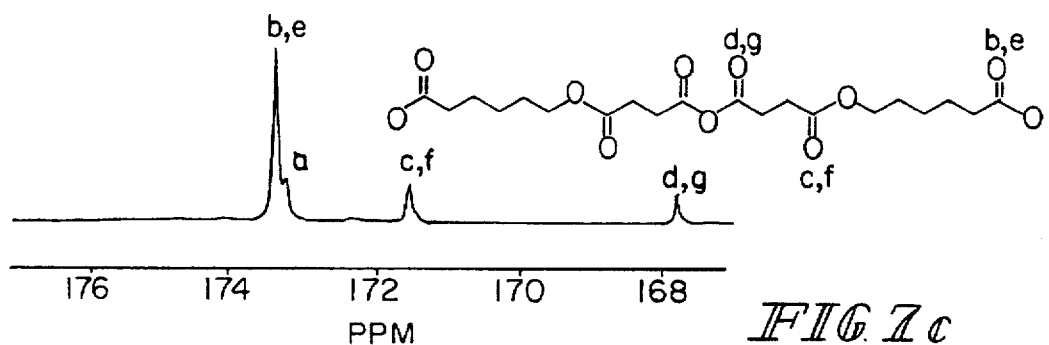
FIG. 7 illustrates $^{13}$C NMR spectra of the carbonyl region for (a) difunctional carboxylic acid-terminated poly(ε-caprolactone), (b) monofunctional carboxylic acid-terminated poly(ε-caprolactone), and (c) chain-extended poly(ester-anhydride).
Figure 7B:
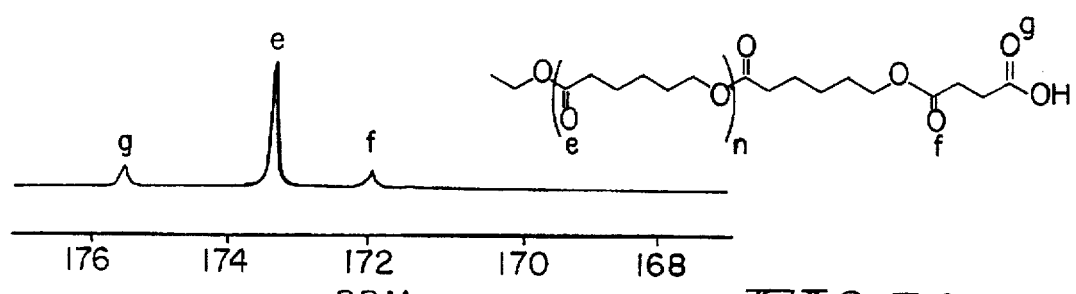
Figure 7A:
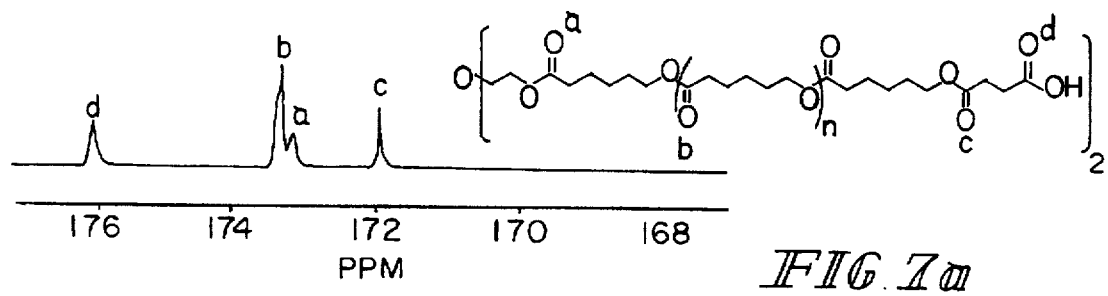
Figure 8C:
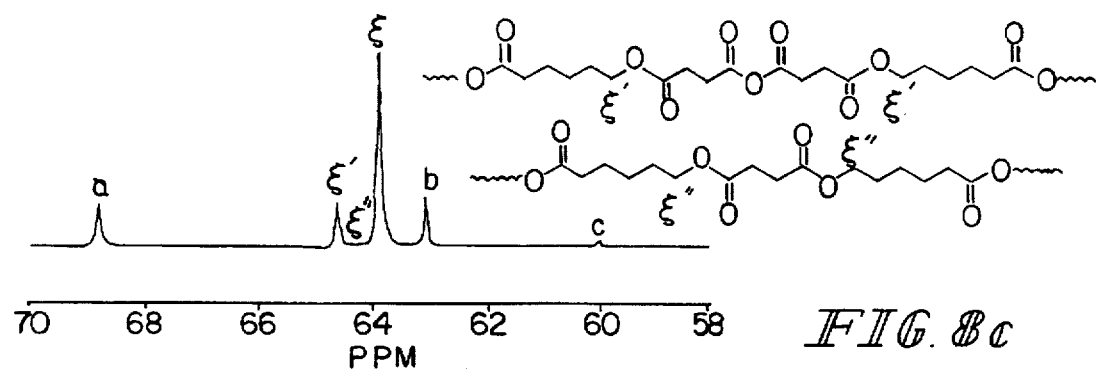
FIG. 8 illustrates $^{13}$C NMR spectra of the ε regions for (a) difunctional carboxylic acid-terminated poly(ε-caprolactone) (b) monofunctional carboxylic acid-terminated poly(ε-caprolactone), and (c) chain-extended poly(ester-anhydride).
Figure 8B:
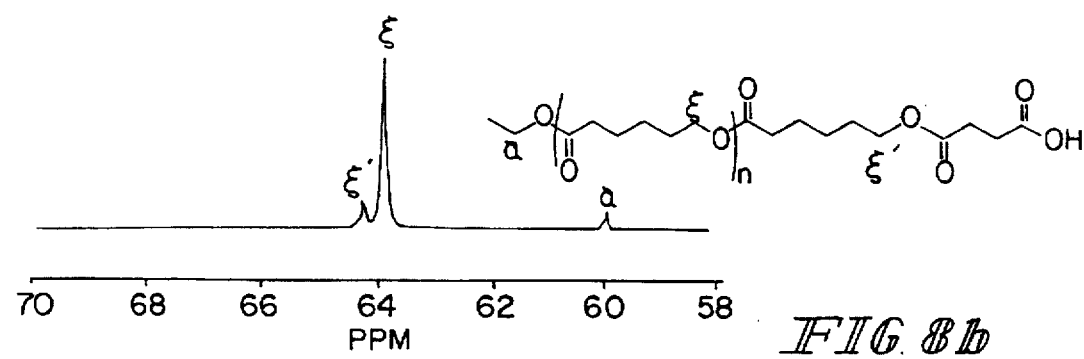
Figure 8A:
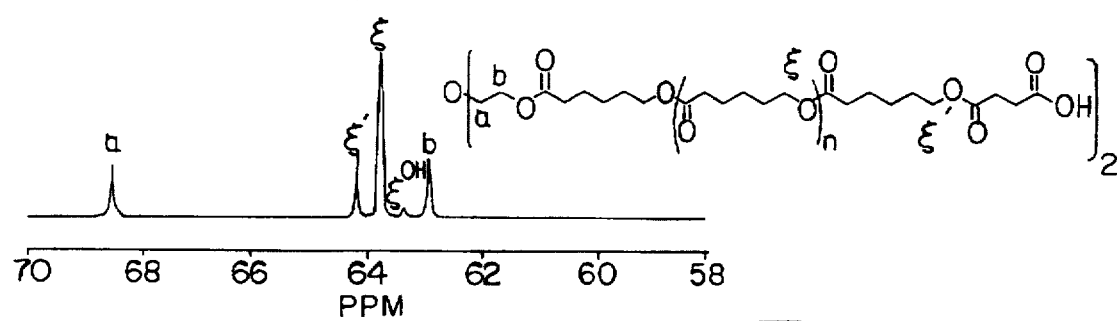
Figure 9C:
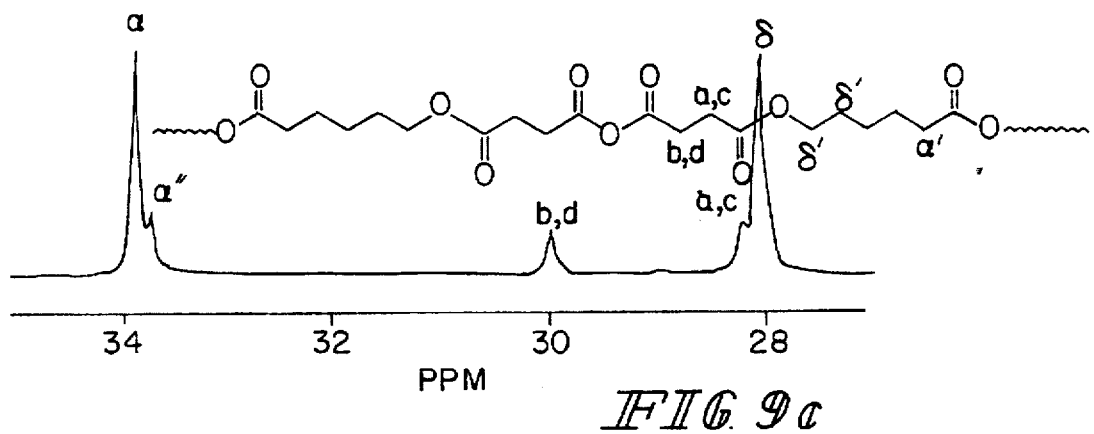
FIG. 9 illustrates $^{13}$C NMR spectra of the α and δ regions for (a) difunctional carboxylic acid-terminated poly(ε-caprolactone), (b) monofunctional carboxylic acid-terminated poly(ε-caprolactone), and (c) chain-extended poly(ester-anhydride).
Figure 9B:
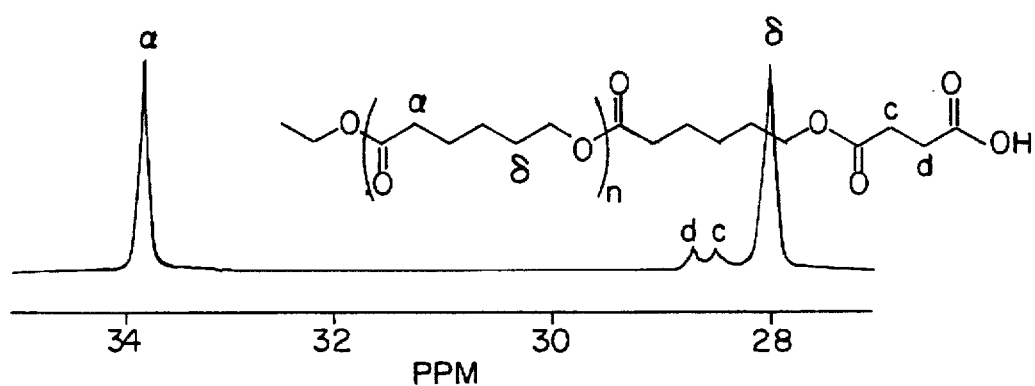
Figure 9A:
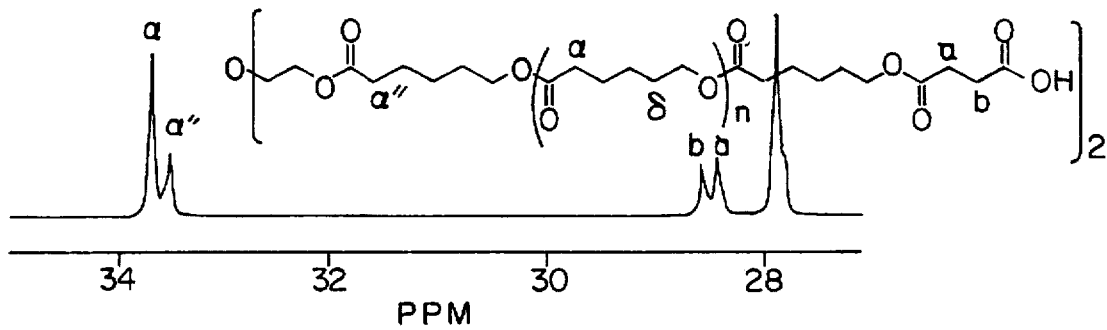

A chain-extended poly(ester-anhydride) containing a variable number of anhydride units along the polymer backbone was synthesized following the reaction scheme shown in FIG. 6. The molar ratio, 2/n, of EtOH-initiated, monofunctional carboxylic acid-terminated poly(ε-caprolactone) (2) to DEG-initiated, difunctional carboxylic acid-terminated, poly(ε-caprolactone) (5) determined the average number of anhydride units per chain, n+1. The polymer produced, with n=5, was analyzed extensively using $^{13}$C NMR. FIGS. 7, 8 and 9 show the $^{13}$C NMR spectra of the carbonyl region, the ε region, and the α and δ regions, respectively, of the prepolymers and the chain-extended product. FIG. 7(a.) shows the carbonyl carbon region for DEG-initiated, carboxylic acid terminated poly(ε-caprolactone) (5). FIG. 7(b.) shows the EtOH-initiated prepolymer (2), which was discussed in detail earlier in FIG. 2(b.). The only difference in the two spectra is that 5 shows a resonance (a), slightly upfield from the main-chain carbonyl carbons, that is due to the carbonyl carbon nearest the DEG initiator residue. FIG. 7(c.) shows the poly(ester-anhydride) product (6), and it is clear that the anhydride forming reaction proceeded to a high extent. The carboxylic acid carbonyl carbons (d and g) have shifted far upfield, consistent with formation of the anhydride linkage. However, the presence of a barely discernible signal between 173.2 ppm and 171.4 ppm indicates that a very small amount of chain extension occurred via the formation of ester linkages. The latter result from incomplete functionalization of the prepolymers (in this case the difunctional prepolymer 5) with terminal succinic acid moieties. Small amounts of residual hydroxyl end groups readily react with carboxylic acid end groups in the presence of DPCP to form the observed ester linkages.

FIGS. 8(a.), (b.), and (c.) depict changes occurring in the ε-carbon region during anhydride formation. FIG. 8(a.) shows signals at 68.6 ppm (a) and 62.9 ppm (b) which were attributed to the methylene units in the DEG initiator moiety in prepolymer 5. The signals at 63.7 ppm (e) and 64.1 ppm (e') were assigned to ε-carbons in the main-chain and adjacent to the terminal succinic acid moieties, respectively. The signal at 63.3 ppm ($ε^{OH}$) was attributed to the carbon adjacent to the residual hydroxyl end groups, indicating that the reaction with succinic anhydride was not totally quantitative for this particular prepolymer. The remainder of the assignments in FIG. 8(a.) and all of the assignments in FIG. 8(b.) are the same as given earlier in FIG. 3(b.). FIG. 8(c.) depicts the ε-carbon region of the chain-extended poly(ester-anhydride) resulting from the reaction of 2 and 5. The main-chain ε-carbons appear in their normal place at 63.9 ppm. The signals at 68.9 ppm (a) and 63.1 ppm (b), due to the methylene units of the DEG initiator moiety in 5, showed virtually no change upon anhydride formation. Likewise, the signal at 59.9 ppm (c) that was assigned to the methylene unit of the ethanol initiator moiety in 2 showed essentially no change as well. The signal at 64.6 ppm was assigned to the ε-carbons of both polymers 2 and 5 upon reaction to form the poly(ester-anhydride) (e'). The small signal at 64.4 ppm anhydride) (e') was assigned to ε-carbons adjacent to succinic acid moieties that formed ester linkages with residual hydroxyl end groups in 5.

FIGS. 9(a.), (b.), and (c.) depict changes occurring in the α- and δ-carbon regions during anhydride formation. The major signals in FIG. 9(a.), at 33.6 and 27.8 ppm, were assigned to the main-chain α- and δ-carbons of 5. The signal at 33.5 ppm (α") was assigned to the α-carbon adjacent to the DEG initiator 0 moiety. The two signals at 28.6 ppm (b) and 28.4 ppm (a) were ascribed to the succinyl methylene carbons at the chain end of 5. The assignments in FIG. 9(b.) are identical to those given in FIG. 3(b.). Upon chain extension, the a α and δ main-chain signals at 33.9 ppm and 28.1 ppm remained virtually unchanged as expected. The signal at 33.7 ppm (α") for 5 also remained virtually unchanged. The signal at 30.0 ppm (b and d) was ascribed to the succinyl methylene carbons adjacent to the anhydride linkages; the signal at 28.3 ppm was assigned to the other succinyl methylene carbons. These assignments are identical to those given in FIG. 3(c.). Additionally, in the region between 28–30 ppm, a small signal (ε') appears that was attributed to the succinyl methylene carbons of ester-linkages within the poly(ester-anhydride) product, formed as a result of residual hydroxyl end groups in 5.

Figure 10:
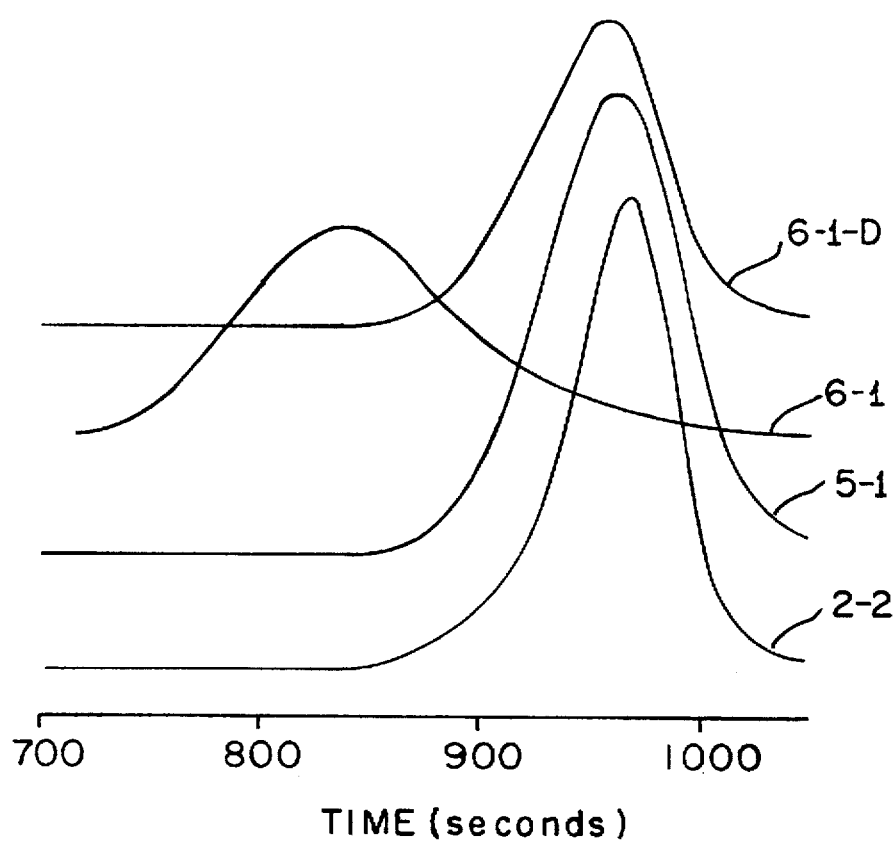
FIG. 10 illustrates gel permeation chromatographs for (a) monofunctional carboxylic acid-terminated poly(ε-caprolactone) (2-2), (b) difunctional carboxylic acid-terminated poly(ε-caprolactone) (5-1), (c) chain-extended poly(ester-anhydride) (6-1), and (d) chain-extended poly (ester-anhydride) after degradation in 37° C. buffered saline solution for 72 h (6-1-D).

FIG. 10 depicts the GPC chromatograms for: monofunctional carboxylic acid-terminated poly(ε-caprolactone) (2-2), difunctional carboxylic acid-terminated poly(ε-caprolactone) (5-1), chain-extended poly(ester-anhydride) derived from the reaction of 2-2 and 5-1 in a molar ratio of 2:5 (6-1), and the latter poly(ester-anhydride) after being subjected to 37° C. buffered saline solution for 72 h (6-1-D), all of which are listed in Table II. According to GPC, the $M_n$ for 2-2was 1,500 g/mol (MWD=1.28), and the $M_n$ for 5-1 was 1,600 g/mol (MWD=1.33). Upon reaction of 2-2and 5-1 in a molar ratio of 2:5, the $M_n$ of the poly(ester-anhydride) was 4,700 g/mol with MWD=2.38. Clearly the molecular weight of the prepolymers has increased upon chain extension with DPCP, although not to the extent that was expected (theoretical 10,500 g/mol). In addition, the MWD was considerably broader than the MWD's of the reactants, as would be expected for a polycondensation reaction. Finally, FIG. 10 shows that the hydrolysis reaction produced a product (6-1-D) with a $M_n$ of 1,600 g/mol and a MWD of 1.40. This GPC data suggests a very rapid degradation of the anhydride linkages in the poly(ester-anhydride) polymer. The ester-linked components discussed earlier are either in such small quantities that they are undetectable by GPC in the degraded polymer, or these ester linkages are more susceptible to hydrolysis than the main-chain poly(ε-caprolactone) backbone.

EXAMPLE 2

Materials.

All reagents were used without further purification. Glycolic acid (99%), and succinic anhydride (97%) were purchased from the Aldrich Chemical Co. Stannous 2-ethyl-hexanoate (stannous octoate, 95%) was purchased from Sigma Chemical Co. ε-Caprolactone (high purity) was donated by Union Carbide Co.

Instrumentation.

Gel permeation chromatography (GPC was used to determine molecular weights and molecular weight distributions, Mw/Mn, of polymer samples with respect to polystyrene standards (Polysciences Corporation).

$^{13}$C NMR spectra of the polymers were obtained on a Bruker AC-200 spectrometer using 5 mm o.d. tubes. Sample concentrations were about 25% (w/v) in CDCl3 containing 1% TMS as an internal reference.

Synthesis of α-Hydroxyl-ω-(Carboxylic Acid) Poly(ε-Caprolactone).

Glassware and stir bar were dried at 145°–155° C. for 24 h, fitted with rubber septa, and cooled under a flow of dry nitrogen. To a 40 mL test tube equipped with a 24/40 ground glass joint and magnetic stir bar were added glycolic acid ($5.1 \times 10^{-3}$ mol, 0.39 g), ε-caprolactone ($8.8 \times 10^{-2}$ mol, 10 g) and stannous octoate catalyst ($1.4 \times 10^{-4}$ mol/mol monomer). The tube was purged with dry nitrogen gas, sealed with a glass stopper, and placed in a 140°0 C. constant temperature oil bath. The polymerization was carried out for 3.5 h with continuous stirring, and then quenched by immersing the tube in an icewater bath. The product was characterized by $^{13}$C NMR with no purification.

Synthesis of (Carboxylic Acid)-Telechelic Poly(ε-Caprolactone).

Figure 13:
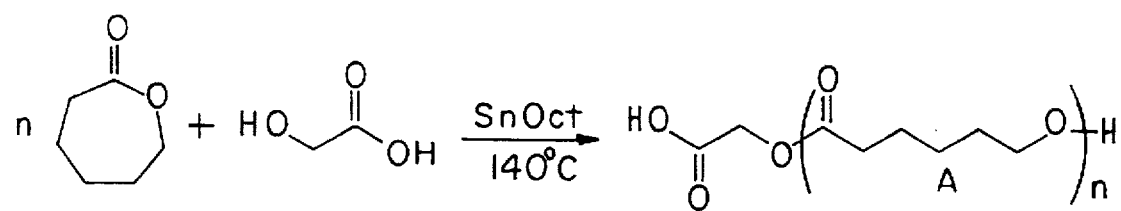
FIG. 13 illustrates the reaction scheme for the synthesis of (carboxylic acid)-telechelic poly(ε-caprolactone) (oligomer B).
Figure 14:
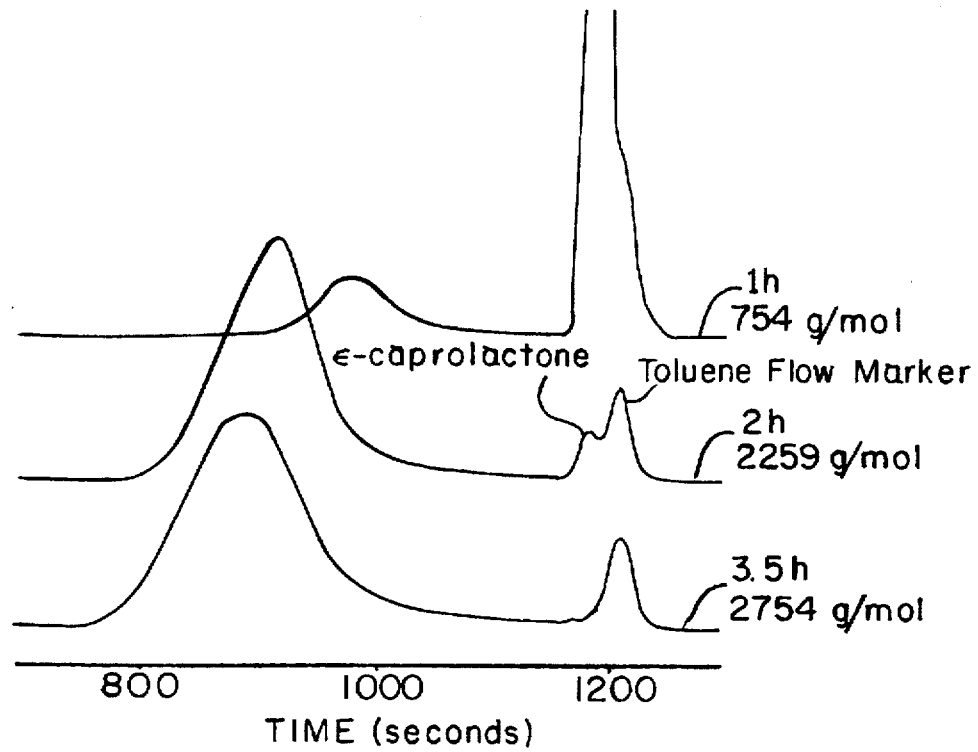
FIG. 14 presents GPC traces showing the incorporation of both ε-caprolactone and succinic anhydride during synthesis of oligomers.

To a 40 mL test tube equipped with a 24/40 ground glass joint and magnetic stir bar were added glycolic acid ($5.4 \times 10^{-3}$ mol, 0.41 g), ε-caprolactone ($8.8 \times 10^{-2}$ mol, 10 g), succinic anhydride endcapper ($5.4 \times 10^{-3}$ mol, 0.55 g), and stannous octoate catalyst ($1.4 \times 10^{4}$ mol/mol monomer). The tube was then purged with dry nitrogen gas, sealed, and placed in a 140° C. constant temperature oil bath. The polymerization was carried out for 12 h with continuous stirring, and then quenched by immersing the tube in an ice-water bath. The product was characterized by $^{13}$C NMR with no purification The synthesis of α-hydroxyl-ω-(carboxylic acid) poly(ε-caprolactone) depicted in FIG. 13, involved the reaction of glycolic acid with ε-caprolactone in the presence of stannous octoate catalyst. In view of the reported role of hydroxyl groups as initiators of the ring-opening polymerization, this reaction was expected to produce an oligomer (A) containing a carboxylic acid group on one end, derived from a single, terminal unit of glycolic acid, and n units of ε-caprolactone, and terminating in a primary hydroxyl group at the other end of the chain. GPC chromatograms of aliquots taken at various times from the polymerization (FIG. 14) clearly show that conversion of the monomer was complete by 3.5 h. However, the final molecular weight (2700 g/mol) was higher than theoretical (2000 g/mol), which was attributed to the condensation polymerization of the α-hydroxyl-ω-(carboxylic acid) oligomers. Additional evidence for the occurrence of condensation polymerization was the appearance of water vapor on the walls of the flask during the quenching process.

(Carboxylic Acid)-Telechelic Poly(ε-Caprolactone).

Figure 11:
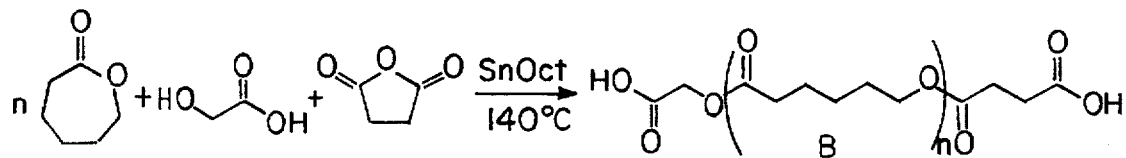
FIG. 11 illustrates the reaction scheme for the synthesis of α-hydroxy-ω(carboxylic acid end functional poly(ε-caprolactone).

The synthesis of (carboxylic acid)-telechelic poly(ε-caprolactone) is depicted in FIG. 11. This polymerization involved ring-opening of ε-caprolactone initiated by glycolic acid, with termination by reaction with succinic anhydride.

Figure 12:
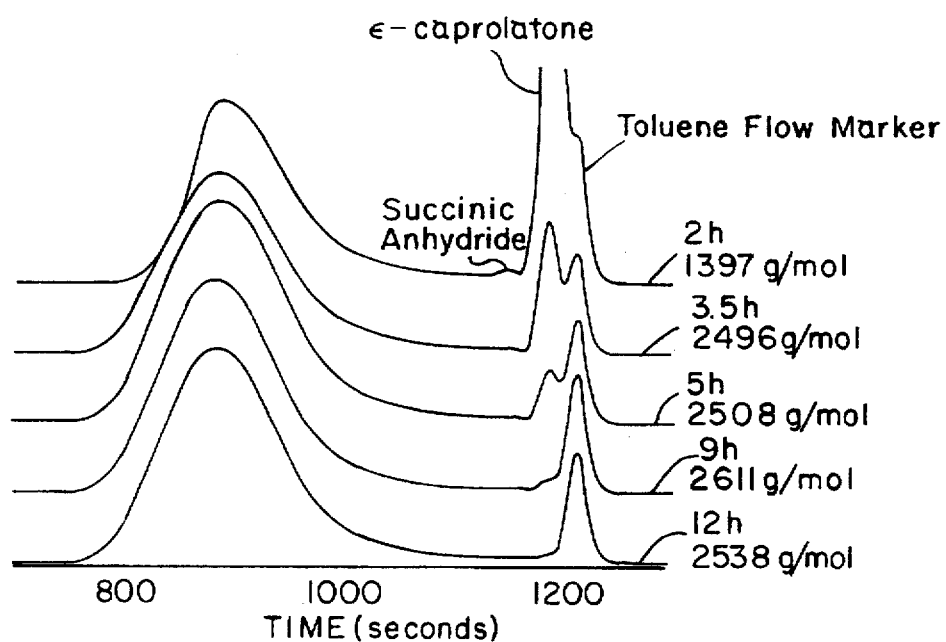
FIG. 12 presents GPC traces showing the incorporation of ε-caprolactone during synthesis of oligomer(A).

GPC was used to monitor the conversion of ε-caprolactone and the incorporation of succinic anhydride onto the polymer chain end. FIG. 12 depicts the GPC chromatograms of aliquots taken at various times, and it clearly shows that by 12 h there is complete conversion of monomer and incorporation of succinic anhydride into the polymer.

EXAMPLE 3

Synthesis of Acid-Terminated Polymers.

Glassware was dried at 145°–155° C. for 24 h, fitted with rubber septa, and cooled under a flow of dry nitrogen. Polymerizations were run in 250 mL Erlenmeyer flasks with 24/40 ground glass joints sealed with evacuated glass stoppers wrapped with teflon tape. To a flask (250 mL) containing a magnetic stir bar were added D,L-lactide (18.17 g, $1.26 \times 10^{-1}$ mol), glycolide (14.63 g, $1.26 \times 10^{-1}$ mol), ε-caprolactone (7.20 g, $6.30 \times 10^{-2}$ mol), glycolic acid (1.66 g, $2.18 \times 10^{-2}$ mol), succinic anhydride (2.19 g, $2.18 \times 10^{-2}$ mol). The flask was purged with nitrogen and heated in a 135° C. constant temperature bath for 20 h with continuous stirring. At 65 h of reaction, the temperature was lowered to 110° C. The polymerization was allowed to proceed for 146 h and was then quenched in an ice-water bath.

Analytical Titration Procedure (2,000 g/mol Sample):

To a 125 mL Erlenmeyer flask was added a (~2,000 g/mol) polymer sample (0.30 g–0.40 g). The polymer sample was completely dissolved in THF (50 mL) and water (15 mL) was added to the solution. Phenolphthalein (1 g/100 mL MeOH) (5 drops) was added to the polymer solution, and the flask was placed in an ice bath. The sample was titrated with an aqueous solution of NaOH (0.5047N) to a light pink end point. An average equivalent weight was calculated from the values of at least three titrations.

EXAMPLE 4

Synthesis of Poly(ε-Caprolactone) in the Absence of Metal Catalyst.

Glassware and stir bar were dried 145°–155° C. for 24 h, fitted with rubber septa, and cooled under a flow of dry nitrogen. Polymerizations were run in 40 mL test tubes with 24/40 ground glass joints sealed with evacuated glass stopper wrapped with Teflon tape. To this test tube was added the appropriate amounts of ε-caprolactone monomer and glycolic acid initiator that would result in the desired molecular weight. The tube was purged with nitrogen and the glass was flamed to aid in the removal of residual water. The tube was then heated in a 135° C. constant temperature bath for the appropriate amount of time (2.5 h for 1000 g/mole).

EXAMPLE 5
Synthesis of Acid Terminated Poly(ε-Caprolactone) in the Absence of Metal Catalyst.

Glassware and stir bar were dried at 145°–155° C. for 24 h, fitted with rubber septa, and cooled under a flow of dry nitrogen. Polymerizations were run in 40 mL test tubes with 24/40 ground glass joints sealed with evacuated glass stoppers wrapped with Teflon tape. To this test tube was added the appropriate amounts of ε-caprolactone monomer, glycolic acid initiator and succinic anhydride endcapper that would result in the desired molecular weight. The tube was purged with nitrogen and the glass was flamed to aid in the removal of residual water. The tube was then heated in a 135° C. constant temperature bath for the appropriate amount of time (generally 11 h).

EXAMPLE 6
Synthesis of Acid Terminated Poly(D,L-Lactide-co-Glycolide-co-ε-Caprolactone) in the Absence of Metal Catalyst.

Glassware and stir bar were dried at 145°–155° C. for 24 h, fitted with rubber septa, and cooled under a flow of dry nitrogen. Polymerizations were run in 40 mL test tubes with 24/40 ground glass joints sealed with evacuated glass stoppers wrapped with Teflon tape. To this test tube was added the appropriate amounts of D,L-lactide, glycolide, and ε-caprolactone monomers, glycolic acid initiator and succinic anhydride endcapper that would result in the desired molecular weight. The tube was purged with nitrogen and the glass was flamed to aid in the removal of residual water. The tube was then heated in a 135° C. constant temperature bath for 102 h, at which time the temperature was reduced to 130° C. for 37.5 h which was then further reduced in temperature to 100° C. for 50 hours. Maximum D,L-lactide incorporation was reached at 189.5 hours.

What is claimed:

1. A poly(ester-anhydride) compound comprising 2 to 20 polyester segments, each having a number average molecular weight of about 400 to about 5000, covalently bound through anhydride linkages.

2. The compound of claim 1 wherein the polyester segments comprise a homopolymer, copolymer or terpolymer of biocompatible hydroxy acids.

3. The compound of claim 1 wherein each of the polyester segments have water solubility at 25° C. of about 0.01 to about 400 mg/ml.

4. The compound of claim 1 wherein the polyester segments comprise copolymers of dihydric alcohols and biocompatible dicarboxylic acids.

5. The compound of claim 1 wherein there are 2–10 polyester segments comprising homopolymers, copolymers or terpolymers of biocompatible hydroxy acids.

6. The compound of claim 2 wherein the polyester segments have a number average molecular weight of about 700 to about 2500.

7. The compound of claim 6 wherein the hydroxy acids are selected from the group consisting of lactic acid, glycolic acid, ε-hydroxy caproic acid and δ-hydroxyvaleric acid.

8. A method for preparing a poly(ester-anhydride) compound of claim 1 which method comprises the step of reacting a carboxy-terminated polyester compound with diphenylchlorophosphate.

9. The method of claim 8 wherein a bis-carboxy functional polyester is also reacted with the carboxy-terminated polyester compound and the diphenylchlorophosphate.

10. The method of claim 8 wherein the polyester reactants have a water solubility at 25° C. of about 0.01 to about 400 mg/ml.

11. The method of claim 8 wherein the polyester reactants comprise copolymers of dihydric alcohols and biocompatible dicarboxylic acids.

12. The method of claim 1 wherein the polyester reactants comprise homopolymers, copolymers or terpolymers of biocompatible hydroxy acids.

13. The method of claim 8 wherein the polyester reactants have a number average molecular weight of about 500 to about 5000.

14. The method of claim 12 wherein the hydroxy acids are selected from the group consisting of lactic acid, glycolic acid, ε-hydroxy caproic acid and δ-hydroxyvaleric acid.

15. A method for preparing a polyester compound of the formula

wherein PE is the divalent residue of a polyester comprising a hydroxy acid polymer and $R^2$ is the residue of a hydroxy functional initiator of the formula $R^2OH$, which method consists essentially of reacting the initiator with at least one cyclic hydroxy acid ester under substantially anhydrous conditions at elevated temperatures.

16. A method for preparing a polyester compound of the formula

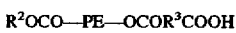

wherein PE is the divalent residue of a polyester comprising a hydroxy acid polymer, $R^2$ is the residue of a hydroxy functional initiator of the formula $R^2OH$, and wherein $R^3$ is the divalent residue of a cyclic anhydride of the formula $OCOR^3CO$, which method consists essentially of reacting the initiator with at least one cyclic hydroxy acid ester under substantially anhydrous conditions at elevated temperatures in the presence of the cyclic anhydride.

17. The method of claim 15 wherein the reaction is continued until the concentration of cyclic ester in the reaction mixture is constant.

18. The method of claim 16 wherein the reaction is continued until the concentration of cyclic ester in the reaction mixture is constant.

19. The method of claim 16 wherein the initiator is a hydroxy acid or a monohydric alcohol, and the initiator and the cyclic anhydride are employed in about equimolar amounts.

20. The method of claim 16 wherein the initiator is a dihydric alcohol and the molar ratio of cyclic anhydride to initiator is about 2:1.

* * * * *